United States Patent [19]

Satomura et al.

[11] Patent Number: 4,728,633
[45] Date of Patent: Mar. 1, 1988

[54] RECORDING MATERIAL

[75] Inventors: Masato Satomura; Ken Iwakura, both of Kanagawa; Akira Igarashi, Shizuoka, all of Japan

[73] Assignee: Fuji Photo Film Co., Ltd., Kanagawa, Japan

[21] Appl. No.: 890,234

[22] Filed: Jul. 29, 1986

[30] Foreign Application Priority Data

Jul. 29, 1985 [JP] Japan .............................. 60-167257
Jul. 30, 1985 [JP] Japan .............................. 60-168359

[51] Int. Cl.$^4$ ...................... B41M 5/16; B41M 5/18; B41M 5/22
[52] U.S. Cl. .................................... 503/221; 427/151; 503/217; 549/225; 549/226
[58] Field of Search ...................... 346/217, 221, 225; 427/151, 150, 152; 549/225, 226; 503/217, 221, 225

[56] References Cited

U.S. PATENT DOCUMENTS 3,901,918 8/1975 Koga et al. .......................... 549/224
4,104,437 8/1978 Vincent et al. ...................... 346/221
4,226,912 10/1980 Iwasaki et al. ....................... 346/221

Primary Examiner—Bruce H. Hess
Attorney, Agent, or Firm—Sughrue, Mion, Zinn, Macpeak & Seas

[57] ABSTRACT

A recording material comprising a fluoran derivative represented by formula (I):

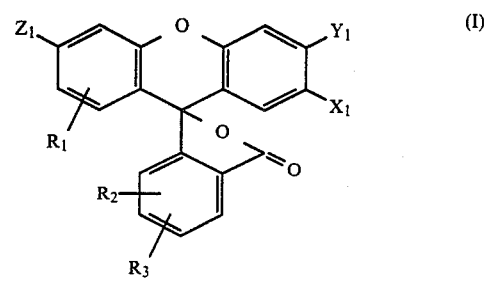

wherein $X_1$ represents a group derived from an amine, or a hydrogen atom; $Y_1$ represents an alkyl group, an alkoxy group, an aryl group, a halogen atom, a group derived from an amine, an aralkyl group, or a hydrogen atom; $Z_1$ represents a group derived from an amine residue; $R_1$ represents a halogen atom, a lower alkyl group having 6 or less carbon atoms, or a hydrogen atom; and either $R_2$ or $R_3$ represents an alkoxy group or an aryloxy group, and either $R_2$ or $R_3$ which does not represent an alkoxy group or an aryloxy group represents an alkyl group, a halogen atom, or a hydrogen atom.

20 Claims, No Drawings

RECORDING MATERIAL

FIELD OF THE INVENTION

The present invention relates to a recording material, and more particularly, to a recording material containing a novel fluoran derivative which is excellent as a precursor of dyes for black color-developing recording materials.

BACKGROUND OF THE INVENTION

Recording materials which utilize an electron-donating colorless dye and an electron-accepting compound are disclosed, for example, in Japanese Patent Publication Nos. 14039/70 and 4160/68. The minimum desirable properties which these types of recording materials must possess are: (1) to have satisfactorily high color density of a developed image and sufficiently high coloring speed; (2) to generate no fog (no color development upon storage prior to use); and (3) to produce a developed image which retains sufficient fastness after color development. However, recording materials which satisfy all of these reguirements have not yet been obtained.

In particular, earnest studies on property (1) described above have been made in recent years concomitant with advances in the technology of recording systems. Various measures to provide recording materials with property (1) have been adopted with respect to heat-sensitive recording materials, which form one group among recording materials. For instance, one measure consists of the use of an electron-accepting compound having a melting point of 60° C. to 100° C. In another measure, an organic acid and a phenolic compounds are used in combination as an electron-accepting substance. Further, the use of a polyvalent metal salt of a compound having an alcoholic hydroxyl group, the use of a copolymer prepared from hydroxyethyl cellulose and maleic anhydride, the addition of waxes, the addition of a carboxylic acid ester (e.g., dimethyl isophthalate, diphenyl phthalate, dimethyl terephthalate or the like) are a sensitizer, and the addition of hindered phenols have all been examined for efficiency in hightening both color density of a developed image and coloring speed.

However, such measures are insufficient to impart heat-sensitive recording materials with property (1) so as to meet recent technological advances relating to high-speed recording.

On the other hand, methods for enhancing the stability of a developed image have also been investigated extensively. For instance, the method of adding a phenol derivative, such as 2,2'-methylenebis(4-methyl-6-tert-butylphenol) or the like, is described in Japanese Patent Publication No. 43386/76. Moreover, the method of adding a water-insoluble modified (e.g., rosin modified) phenol resin is disclosed in Japanese Patent Application (OPI) No. 17347/78 (the term "OPI" as used herein refers to a "published unexamined Japanese patent application"), and the method of adding an terephthalic acid ester is described in Japanese Patent Application (OPI) No. 72996/81.

However, all heat-sensitive recording materials produced in accordance with the above-described methods result in insufficient stability of the developed image.

Further, it is well-known to use various kinds of fluoran derivatives as the precursors of dyes for pressure-sensitive or heat-sensitive manifold paper, as disclosed in U.S. Pat. No. 3,825,432, West German Patent Application (OLS) No. 2,262,127, and Japanese Patent Publication No. 38245/76. All color images obtained from these known fluoran derivatives do not have true black color tone, and some of the fluoran derivatives suffer from the defect that they are unstable in the atmosphere, while others have the defect that dyes produced therefrom are inferior with respect to fastness to light, moisture, etc.

Moreover, various compounds have been examined for usefulness as colorless dyes for recording materials which can provide a pure black hue. Nevertheless, only three kinds of compounds, namely, 2-anilino-3-alkyl-6-aminofluoran, 2-anilino-3-chloro-6-aminofluoran and spiro[acridineisobenzofuran]-10-aryl-3'-one, have been found to be colorless dyes capable of providing a black hue, and the number of compounds having such a property is very limited. These compounds also have the defect similar to that of the abovementioned compounds.

SUMMARY OF THE INVENTION

Therefore, an object of the present invention is to provide a recording material containing a novel fluoran derivative having excellent properties as a precursor of dyes for black color-developing recording materials.

Another object of the present invention is to provide a heat-sensitive recording material which is capable of providing a pure black hue, and is excellent in color developability and stability of a developed image, while at the same time satisfying other conventional requirements for heat-sensitive recording materials.

These and other objects of the present invention are attained by means of a recording material which comprises a fluoran derivative represented by the following formula (I):

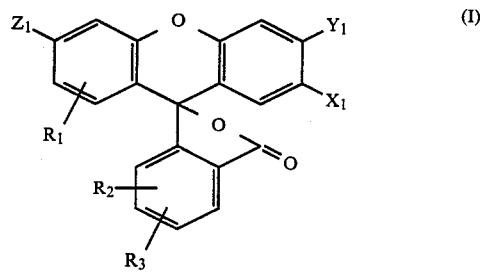

wherein $X_1$ represents an amine residue or a hydrogen atom; $Y_1$ represents an alkyl group, an alkoxy group, an aryl group, a halogen atom, an amine residue, an aralkyl group, or a hydrogen atom; $Z_1$ represents an amine residue; $R_1$ represents a halogen atom, a lower alkyl group having 6 or less carbon atoms, or a hydrogen atom; and either $R_2$ or $R_3$ represents an alkoxy group or an aryloxy group, and either $R_2$ or $R_3$ which does not represent an alkoxy group or an aryloxy group represents an alkyl group, a halogen atom or a hydrogen atom. The term an "amine residue" used herein means a "group derived from an amine".

DETAILED DESCRIPTION OF THE INVENTION

The fluoran derivatives represented by the following formula (II) are preferred:

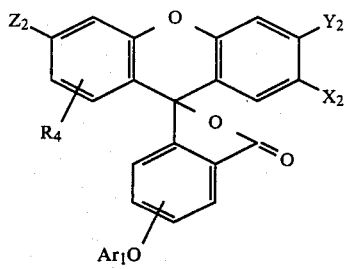

(II)

In formula (II), $X_2$ represents a hydrogen atom or an amine residue; $Y_2$ represents a hydrogen atom, an alkyl group, an alkoxy group, an aryl group, a halogen atom, or an amine residue; $Z_2$ represents an amine residue; $Ar_1$ represents an aryl group; and $R_4$ represents a hydrogen atom, a halogen atom, or a lower alkyl group having 6 or less carbon atoms.

Of amine residues represented by $X_2$ in formula (II), those having the formula

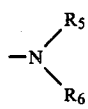

are preferred over others.

Substituents $R_5$ and $R_6$ preferably represent a hydrogen atom, an alkyl group containing not more than 18 carbon atoms, or an aryl group containing from 6 to 12 carbon atoms, and $R_5$ and $R_6$ particularly preferably represent a hydrogen atom, an alkyl group containing not more than 10 carbon atoms, or an aryl group containing from 6 to 10 carbon atoms.

Alkyl groups and aryl groups represented by $R_5$ and $R_6$ may have substituents. Preferably examples of such substituents include alkyl groups, halogen atoms, aryl groups, alkoxy groups, aryloxy groups, cyano groups and acyl groups.

With respect to the substituents represented by $Y_2$, a hydrogen atom, alkyl groups having from 1 to 18 carbon atoms, alkoxy groups having from 1 to 5 carbon atoms, aryl groups having from 6 to 12 carbon atoms, and halogen atoms are more desirable. In particular, a methyl group, an ethyl group, a propyl group, a butyl group, a pentadecyl group, a methoxy group, an ethoxy group, a phenyl group, a tolyl group, a xylyl group, halogen-substituted phenyl groups, a fluorine atom, a chlorine atom and amine residues represented by $Z_2$ are of greater advantage for purposes of the present invention.

Amine residues represented by $Z_2$ include both primary and secondary amine residues having a total of from 1 to 8 carbon atoms. These amine residues are preferred over others. In particular, a diethylamino, dibutylamino, dioctylamino, dihexylamino, N-ethyl-N-p-tolylamino, N-methyl-N-cyclohexylamino, piperidino, benzylamino, toluidino, N-ethyl-N-isoamylamino, p-ethyltoluidino, N-ethyl-N-isobutylamino and cyclohexylamino group are of greater advantage in the present invention.

Preferred aryl groups represented by $Ar_1$ are aryl groups having not more than 12 carbon atoms, especially a phenyl group, a tolyl group, a xylyl group and halogen-substituted phenyl groups.

Of substituents represented by $R_4$, those preferred over others are a hydrogen atom, a chlorine atom, a methyl group and an ethyl group.

Heat-sensitive recording materials which contain the fluoran derivatives represented by formula (II) have excellent properties in that they are only slightly colored in the background areas, and the adverse effects of fog due to storage and lowering of color developability with the lapse of time are minimal.

Every fluoran derivative which can be represented by formula (II) is a novel compound obtained as colorless or light-colored crystals. These fluoran derivatives are highly soluble in organic solvents, and more advantageously, the produce black color rapidly upon contact with an electron-accepting substance. The colored dye is highly stable compared with those obtained from known color formers, discoloration and fading scarcely occur even upon prolonged optical exposure or heating, or even under high humidity conditions. Accordingly, the fluoran derivatives represented by formula (II) are particularly advantageous from the standpoint of ensuring long-range preservation of records. Moreover, they are excellent in stability as color formers, i.e., they do not cause deterioration, undesired coloration and so on even upon long-range storage, and can retain sufficiently high color formability for a long period of time. These properties are almost ideal for color formers of recording materials, such as pressure-sensitive or heat-sensitive manifold paper, or the like.

Typical examples of the fluoran derivatives represented by formula (II) include the following compounds:

(II-1) 2-Anilino-3-methyl-6-diethylamino-5'-phenoxyfluoran,
(II-2) 2-Anilino-3-chloro-6-diethylamino-5'-phenoxyfluoran,
(II-3) 2-Diethylamino-3-phenyl-6-diethylamino-5'-phenoxyfluoran,
(II-4) 2-Anilino-3-methyl-6-N-ethyl-N-isoamylamino-5'-phenoxyfluoran,
(II-5) 2-Anilino-3-methyl-6-N-ethyl-N-isoamylamino-6'-phenoxyfluoran,
(II-6) 2-Anilino-3-chloro-6-dibutylamino-5'-p-tolyloxyfluoran,
(II-7) 2-Anilino-3-methyl-6-N-ethyl-N-isobutylamino-5'-phenoxyfluoran,
(II-8) 2-Anilino-3-methyl-6-N-ethyl-N-isobutylamino-6'-phenoxyfluoran,
(II-9) 2-Anilino-3-methyl-6-N-cyclohexyl-N-methylamino-5'-phenoxyfluoran,
(II-10) 2-Anilino-3-methyl-6-N-cyclohexyl-N-ethylamino-6'-phenoxyfluoran,
(II-11) 2-Anilino-3-methyl-6-N-ethyl-N-p-tolylamino-5'-phenoxyfluoran,
(II-12) 2-α-ethoxyethylamino-3-chloro-6-N-ethyl-N-isoamylamino-5'-phenoxyfluoran,
(II-13) 2-β-ethoxyethylamino-3-chloro-6-N-ethyl-N-isoamylamino-6'-phenoxyfluoran,
(II-14) 3,6-bis(N-isoamyl-N-ethylamino)-5'-phenoxyfluoran, and
(II-15) 2-Anilino-3-methyl-6-diethylamino-5'-p-chlorophenoxyfluoran, In the class of the fluoran derivatives to which the present invention relates, those represented by the following formula (III) are also preferred.

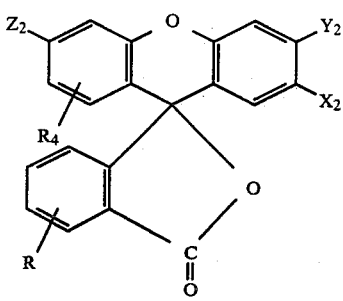

In formula (III), $X_2$, $Y_2$, $Z_2$ and $R_4$ represent the same meanings as in formula (II), and R represents an alkoxy group.

$X_2$, $Y_2$, $Z_2$ and $R_4$ preferably the groups or atoms mentioned as the preferable examples of $X_2$, $Y_2$, $Z_2$ and $R_4$ in formula (II). R preferably represents an alkoxy group containing 12 or less carbon atoms.

Among the fluoran derivatives represented by formula (III), those represented by formula (IV) are particularly preferred. (In the following formula (IV), numbers are assigned to substitution positions on the fluoran ring, respectively.)

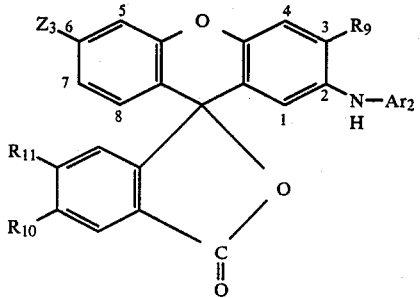

In formula (IV), $Z_3$ represents an amino residue; $R_9$ represents an aryl group, an aralkyl group, an alkyl group, a halogen atom, an alkoxy group, or a hydrogen atom; $Ar_2$ represents an aryl group; and either $R_{10}$ or $R_{11}$ represents an alkoxy group, and either $R_{10}$ or $R_{11}$ which does not represent an alkoxy group represents a hydrogen atom, a halogen atom, or an alkyl group.

$Z_3$ is preferably represented by

wherein $R_7$ represents an alkyl group containing not more than 18 carbon atoms, and $R_8$ represents a lower alkyl group having 6 or less carbon atoms.

An alkyl group represented by $R_7$ preferably contains an even-numbered amount of carbon atoms, and has a chain structure such that there is a methylene group at the α-position. Particularly preferred alkyl groups for $R_7$ include a hexadecyl group, an octadecyl group, a decyl group, a dodecyldecyl group, an octyl group, an ethylhexyl group, a hexyl group, a butyl group, an ethyl group and the like. $R_8$ preferably represents a lower alkyl group having 6 or less carbon atoms substituted by a methylene group at the α-position, with preferable examples including an isoamyl group, an amyl group, a butyl group, an isobutyl group, a propyl group, an ethyl group, a methyl group and the like. Preferred examples of $R_9$ are halogen atoms and alkyl groups.

$Ar_2$ preferably represents an aromatic ring which may be substituted, and more preferably selected from among a phenyl group, a chlorophenyl group, a tolyl group, a butylphenyl group, a dibutylaminophenyl group, an α-naphthyl group and other similar aryl groups. Either $R_{10}$ or $R_{11}$ preferably represents an alkoxy group containing not more than 12 carbon atoms, such as a methoxy group, an ethoxy group, a butoxy group, a chloroethoxy group, a β-methoxyethoxy group, a β-phenoxyethoxy group, a β-benzyloxyethyl group, a cinnamyloxy group and the like.

In particular, compounds of the formula (IV) in which $R_{10}$ is an alkoxy group, $Ar_2$ is a β-ethoxyethyl group and $R_9$ is a halogen atom, and compounds in which $R_{10}$ is an alkoxy group, $Ar_2$ is a phenyl group, a chlorophenyl group or a tolyl group and $R_9$ is a halogen atom or an alkyl group are preferred fluorans for producing a black hue upon contact with phenols.

Recording materials containing fluoran derivatives represented by formula (IV) are excellent with respect to color density of a developed image and color-developing speed, and the developed colors are highly stable as compared with dyes obtained from conventional color-forming agents. In other words, in the recording materials of the present invention discoloration and fading upon prolonged optical exposure, heat application or moisturization rarely occur. Hence, these materials also are particularly advantageous from the viewpoint of long-term preservation of records. In addition, the fluoran derivatives themselves are excellent in stability, and do not cause deterioration and coloration even after long-term storage, and have ideal properties for a color-forming agent.

The following compounds are typical examples of fluoran derivatives represented by formula (IV):

(IV-1) 2-Anilino-3-methyl-6-N-hexyl-N-methylamino-5'-methoxyfluoran,
(IV-2) 2-Anilino-3-methyl-6-N-octyl-N-methylamino-5'-methoxyfluoran,
(IV-3) 2-p-Chloroanilino-3-chloro-6-N-decyl-N-isoamylamino-6'-ethoxyfluoran,
(IV-4) 2-Anilino-3-pentyl-6-N-decyl-N-ethylamino-5'-butoxyfluoran,
(IV-5) 2-Anilino-3-chloro-6-N-octyl-N-ethylamino-5'-β-phenoxyethoxyfluoran,
(IV-6) 2-p-Chloroanilino-3-ethyl-6-N-hexadecyl-N-methylamino-5'-β-phenoxypropoxyfluoran,
(IV-7) 2-Anilino-3-n-amyl-6-N-butyl-N-octadecylamino-5'-isoamyloxyfluoran,
(IV-8) 2-Anilino-3-phenyl-6-N-decyl-N-isoamylamino-5'-propoxyfluoran,
(IV-9) 2-Toluidino-3-methyl-N-hexadecyl-N-butylamino-5'-β-cyanoethoxyfluoran,
(IV-10) 2-Anilino-3-methyl-6-diethylamino-5'-methoxyfluoran,
(IV-11) 2-Anilino-3-methyl-6-dibutylamino-5'-ethoxyfluoran,
(IV-12) 2-Anilino-3-chloro-6-diethylamino-5'-ethoxyfluoran,
(IV-13) 2-Butylamino-3-chloro-6-diethylamino-6'-methoxyfluoran,
(IV-14) 2-Butylamino-3-chloro-6-diethylamino-5'-methoxyfluoran,
(IV-15) 2-β-Ethoxyethylamino-3-chloro-6-diethylamino-6'-methoxyfluoran, and (IV-16)  2-β-Phenoxyethylamino-3-chloro-6-diethylamino-5'-methoxyfluoran.

Methods for synthesizing the fluoran derivatives represented by formula (II) are described below.

The fluoran derivatives of formula (II) can be prepared using various methods, but two representative methods will be illustrated hereinafter in detail.

SYNTHESIS METHOD 1

A condensation reaction is effected between a 2-(2-hydroxy-4-substituted aminobenzoyl)-4- or -5-aryloxybenzoic acid and a 2-substituted-4-alkoxyaniline derivative in the presence of an acid catalyst.

SYNTHESIS METHOD 2

A 2-amino-3-substituted-6-substituted amino-5'- or -6'-aryloxyfluoran is reacted with an alkylating agent or an arylating agent, if necessary, in the presence of a proper solvent and/or additives to achieve alkylation or arylation of the amino group located at the 2-position.

Suitable examples of acid catalysts to be used in Synthesis Method 1 include Lewis acids such as zinc chloride, aluminium chloride, magnesium chloride, calcium chloride and the like, and Bronsted acids such as sulfuric acid, p-toluenesulfonic acid, methanesulfonic acid and the like.

Suitable examples of alkylating agents to be used in Synthesis Method 2 include alkyl halides, alkylsulfonates, alkyl-p-toluenesulfonates and the like, and examples of arylating agents include aryl halides, aryl-p-toluenesulfonates and the like.

As solvents which can optionally be used in Synthesis Method 2, examples include methanol, ethanol, isopropanol, methyl cellosolve, ethyl cellosolve, benzene, toluene, xylene, dimethylformamide, acetone, methyl ethyl ketone and other generally used organic solvents.

Additives which can optionally be used in Synthesis Method 2 include potassium carbonate, sodium carbonate, magnesium oxide, calcium oxide, triethylamine, potassium iodide, potassium bromide, sodium iodide, sodium bromide, tetrabutylammonium iodide, tetrabutylammonium bromide, iodine, copper powder, copper oxide, cuprous iodide, cupric iodide, nickel compounds, cobalt compounds and so on.

A 2-(2-hydroxy-4-substituted aminobenzoyl)-4- or -5-aryloxybenzoic acid, which is used as a starting material in Synthesis Method 1, can be prepared in the following manner.

First, 4-aryloxyphthalic acid is prepared by reacting a 4-nitro-N-substituted phthalimide or a 4-nitrophthalic acid diester with an alkali metal salt of a phenol derivative in a polar solvent such as dimethyl sulfoxide, dimethylformamide, etc., or by reacting a 4-hydroxyphthalic acid with an arylating agent to convert the hydroxy group to the corresponding aryloxy group and subsequently subjecting the resulting phthalate to hydrolysis. The thus-obtained 4-aryloxyphthalic acid is converted to 4-aryloxyphthalic anhydride in a conventional manner, and then reacted with an m-N-substituted aminophenol derivative. Thus, a 2-(2-hydroxy-4-substituted aminobenzoyl)-4- or -5-aryloxybenzoic acid is prepared.

A specific synthesis example of the fluoran derivative as described above is illustrated in detail below.

SYNTHESIS EXAMPLE 1

Synthesis of 2-Anilino-3-methyl-6-diethylamino-5'-phenoxyfluoran 0.1 Mole of dimethyl 4-nitrophthalate and 0.1 mole of sodium phenolate were reacted with each other in a solvent of dimethylformamide at 100° C. over a 3-hour period under a stream of nitrogen. After being allowed to stand at room temperature and thereby cooled, the reaction mixture was poured into a dilute aqueous solution of hydrochloric acid, and extracted with ethyl acetate. The solvent was distilled away from the extract to yield dimethyl 4-phenoxyphthalate. Then, dimethyl 4-phenoxyphthalate thus-obtained was refluxed in a mixture of ethanol and an aqueous solution of potassium hydroxide to result in conversion into 4-phenoxyphthalic acid. Thereafter, the acid underwent reaction in an acetic acid/acetic anhydride mixture at a temperature of 100° C., and the solvent was distilled away from the reaction solution to yield 4-phenoxyphthalic anhydride. Subsequently, equimolar amounts of 4-phenoxyphthalic anhydride. Subsequently, equimolar amounts of 4-phenoxyphthalic anhydride and m-diethylaminophenol were refluxed in toluene to yield a 2-(2-hydroxy-4-diethylaminobenzoyl)-4- or -5-aryloxybenzoic acid.

A 0.01 mole portion of the thus-obtained 2-(2-hydroxy-4-diethylaminobenzoyl)-4- or -5-aryloxybenzoic acid, 0.01 mole of 3-methyl-4-anilinoanisole and 15 ml of concentrated sulfuric acid were mixed, and stirred at 0° C. for 3 hours and subsequently stirred at room temperature for 40 hours.

The reaction mixture was poured into ice water, neutralized with sodium hydroxide, and extracted with ethyl acetate. After the solvent was distilled away from the extract, the residue was purified by passing through a silica gel column using a chloroform/methanol mixture as a developing solvent. Thus, 2-anilino-3-methyl-6-diethylamino-5'-phenoxyfluoran (m.p. 178°-185° C.) was obtained.

Typical synthesis methods of fluoran derivatives represented by general formula (IV) are described below.

SYNTHESIS METHOD 3

As a starting material, 2-(2-hydroxy-4-dialkylaminobenzoyl)-4 or 5-alkoxybenzoic acid or 2-(2-hydroxy-4-dialkylaminobenzoyl)-4 or 5-hydroxybenzoic acid obtained by mixing and heating 4-alkoxy or hydroxyphthalic anhydride and an aminophenol derivative, such as 3-dialkylaminophenol, 3-alkylaminophenol, etc., is employed. Using a catalyst which is normally used in the Friedel-Crafts reaction, e.g., zinc chloride, aluminium chloride, or the like, in this condensation reaction brings about rather poor results. More specifically, the use of such catalysts is undesirable because much colored matter is produced, the yield is lowered, and difficulty in separation and purification of the product is increased.

A 2-arylamino-3-unsubstituted or substituted-6-substituted amino-5' or 6'-alkoxyfluoran can be prepared by reacting the above-described alkoxybenzoic acid derivative with a 4-arylamino-3-substituted or unsubstituted anisole or phenetole, or by condensing the above-described alkoxybenzoic acid derivative and a 4-N-acyl-N-arylamino-3-substituted or unsubstituted anisole or phenetole. In this reaction, Lewis acids, or organic or inorganic acids, e.g., sulfuric acid, fuming sulfuric acid, p-toluenesulfonic acid, methanesulfonic acid, polyphosphoric acid, etc., may be used.

Although one might presume that an undesirable cleavage reaction of the ether linkage at the 4'- or 5'-position would occur in the presence of sulfuric acid, fuming sulfuric acid or the like, this side-reaction does not occur during synthesis, but rather, the condensation reaction proceeds smoothly.

Accordingly, it is seen that in synthesizing colorless dyes, the benzoic acid derivatives obtained by using alkoxyphthalic anhydrides as a starting material are useful, similar to the benzoic acid derivatives prepared using hydroxyphthalic anhydride as a starting material. In the case of hydroxyphthalic anhydride, however, it is necessary to carry out the etherification employing a process or a method which proceeds substantially free from undesirable side-reactions. Etherification methods are well-known, and ethers can be obtained in high yields with ease by heating both halides of corresponding alcohols and sulfates or alkyl- or aryl-sulfonates in a polar solvent in the presence of a base.

A more specific example of fluoran derivatives represented by general formula (IV) is illustrated below.

SYNTHESIS EXAMPLE 2

Synthesis of 2-Anilino-3-methyl-6-diethylamino-5'-or 6'-methoxyfluoran 0.1 Mole of 2-(2'-hydroxy-4'-diethylaminobenzoyl)-5 or 6-methoxybenzoic acid was measured and placed in a flask equipped with a stirrer. While the flask was cooled with ice, 100 ml of a sulfuric acid-fuming sulfuric acid mixture was added thereto slowly to dissolve the methoxybenzoic acid derivative. Further, 0.1 mole of 4-methoxy-2-methyl-diphenylamine was added thereto, and the resulting mixture was kept at a temperature of 20° C. to 60° C. for 24 hours.

The reaction mixture was then poured into an aqueous solution of sodium hydroxide, and adjusted to pH 9 to result in separation of the product. The product containing a small amount of colored matter and the intended phthalide was purified by column chromatography. The purified matter provided a clear, dense, blackish-violet color on a thin-layer chromatoplate (TLC). In addition, it formed black color upon contact with benzyl p-hydroxybenzoate. Additionally, the thus-obtained colorless dye assigned to the 5'-methoxy compound had a melting point of 206° to 207° C., and one assigned to the 6'-methoxy compound showed a melting point of 134° to 135° C. The 5'-methoxy compound provided black color of high density, while the 6'-methoxy compound formed slightly reddish-black color.

The fluoran derivatives of the present invention are capable of providing a black hue upon contact with an electron-accepting substance such as an organic or inorganic acid, etc. Specific examples of electron-accepting substances include acid clay, activated clay, phenol resins, metal salts of alkyl- or aralkyl-substituted salicylic acids, zinc thiocyanate, zinc chloride, and so on. Examples of preferred phenol derivatives employed in a heat-sensitive recording paper in accordance with the present invention are those having at least one or more of a phenolic hydroxyl group, more preferably phenols which have no substituent group at the 2- or 6-position, such as bis(4-hydroxyphenyl)alkane derivatives, bis(3-chloro-4-hydroxyphenyl)alkane derivatives, bis(4-hydroxyphenyl)sulfones, (4-hydroxyphenyl)-(4'-alkoxyphenyl)sulfone derivatives, p-hydroxybenzoic acid ester derivatives, resorcylic acid ester derivatives, orsellinic acid ester derivatives, gallic acid ester derivatives, salicylic acid and alkyl- or aralkyl-substituted compounds thereof or the zinc salts thereof, and so on.

Typical examples of phenol derivatives described above include: 2-(4-hydroxyphenyl)-2-(3-isopropyl-4-hydroxyphenyl)propane, 2-(4-hydroxyphenyl)-2-(3-allyl-4-hydroxyphenyl)propane, 2-(4-hydroxyphenyl)-2-(3-methyl-4-hydroxyphenyl)propane, α-isopropyl-β-naphthol, methyl-4-hydroxybenzoate, monomethylated dihydroxybiphenyls, 2,2-bis(4-hydroxyphenyl)propane (bisphenol A), 4,4'-isopropylidenebis(2-methylphenol), 1,1-bis(3-chloro-4-hydroxyphenyl)cyclohexane, 1,1-bis(3-chloro-4-hydroxyphenyl)-2-ethylbutane, 4,4'-isobutylidenediphenol, benzyl 4-hydroxybenzoate, m-chlorobenzyl 4-hydroxybenzoate, 62-phenethyl 4-hydroxybenzoate, 4-hydroxy-2',4'-dimethyldiphenylsulfone, 1-t-butyl-4-p-hydroxyphenylsulfonyloxybenzene, 4-N-benzylsulfamoylphenol, p-methylbenzyl 2,4-dihydroxybenzoate, β-phenoxyethyl 2,4-dihydroxybenzoate, benzyl 2,4-dihydroxy-6-methylbenzoate, 1,1-bis(4-hydroxyphenyl)cyclohexane, cinnamyl resorcylate, β-phenetyl orsellinate, cinnamyl orsellinate, β-o-chlorophenoxyorsellinate, o-methylbenzyl resorcylate, 2,4-dimethylphenoxyethyl resorcylate, β,β'-bis-4-hydroxyphenyl thioethyl ether, β-methylphenoxyethyl resorcylate, methyl α,α-bis(4-hydroxyphenyl)acetate, β,β-bis-4-hydroxyphenylthioethyloxymethane, and so on.

Among these phenol compounds, alkylenebisphenols, cycloalkylenebisphenols, phenol compounds having an electron-attracting group and the like are particularly useful.

When the fluoran derivatives in accordance with the present invention are applied to a heat-sensitive recording paper, their combined use with heat fusible substances can speed up color development to a great extent even where the fluoran derivatives are not fused at a temperature desired for use on account of the long-chain alkyl group containing therein. Further, an electron-accepting substance employed therein cannot be molten at a temperature desired for use. Thus, the resulting heat-sensitive recording paper can be suitably adapted for use in a high-speed facsimile machine. These heat fusible substances are colorless solids at ordinary temperature, and have a sharp melting point within a temperature range within heating temperatures ranges generally used for copying, i.e., in the vicinity of about 70° C. to about 160° C., preferably 70° C. to 140° C. Moreover, these heat fusible substances can acquire, in a fused condition, the quality that at least either the above-described dye precursors or electron-accepting substances, desirably both of them, are rendered soluble therein.

Suitable examples of heat fusible substances include erucic acid, stearic acid, behenic acid, palmitic acid, stearic acid amide, behenic acid amide, stearic anilide, stearic acid toluidide, N-myristoyl-p-anisidine, N-myristoyl-p-phenetidine, 1-methoxycarbonyl-4-N-stearylcarbamoylbenzene, N-octadecylurea, N-hexadecylurea, N,N'-didodecylurea, phenylcarbamoyloxydodecane, p-t-butylphenolphenoxyacetate, p-phenylphenol-p-chlorophenoxyacetate, 4,4'-isopropylidenebismethoxybenzene, β-phenylethyl-p-phenyl phenyl ether, 2-p-chlorobenzyloxynaphthalene, 2-benzyloxynaphthalene, 1-benzyloxynaphthalene, 2-phenoxyacetyloxynaphthalene, diphenylphthalate, 1-hydroxy-2-naphthoic acid phenyl ester, 2-benzoyloxynaphthalene, p- benzyloxybenzoic acid benzyl ester, hydroquinone acetate, ethylenebisstearamide, benzoin, α-naphthol benzoate, β-naphthol p-methylbenzoate, p-t-butylphenol phenoxyacetate, p-phenylphenol-p-chlorophenoxyacetate, 4,4'-cyclohexylidenediphenol diacetate, 4,4'-isopropylidenediphenol dimethyl ether, β-phenylethyl-p-phenylphenol ether, oxynaphthoic acid phenyl ester, p-methoxycarbonylbenzoic acid ethylamide, stearylurea, ditolyl carbonate, 1-phenoxy-2-p-tolyloxyethane, 1-p-chlorophenoxy-2-phenoxyethane, β-phenoxyethoxyanisole, 1,4-bisethoxycarbonyloxybenzene, 1,4-dicyclohexylbenzene, 4,4'-dimethylbenzophenone, o-fluorobenzoyldurene, benzoyldurene, o-chlorobenzoylmesitylene, benzoylbiphenyl, o-β-phenoxyethoxybenzoic acid, ββ'-bis-p-methoxyphenoxyethoxymethane, β,β'-bis-p-methoxyphenoxyethoxymethane, β,β'-bis-p-ethoxyphenoxyethoxymethane and so on.

Of these substances, ethers, ketones, esters and amides which have a phenolic hydroxyl group or an aromatic ring-like aromatic amine derivatives are preferred over others.

Methods for producing recording materials in which the dye precursors in accordance with the present invention are utilized are described in detail below.

Pressure sensitive paper employing the dye precursors of the present invention can adopt various forms as described, for example, in U.S. Pat. Nos. 2,505,470, 2,505,471, 2,505,489, 2,548,366, 2,712,507, 2,730,456, 2,730,457, 3,418,250.

Pressure sensitive paper is generally constructed by a pair of sheets which contain an electron-donating colorless dye in accordance with the present invention and an electron-accepting compound independently.

As for the encapsulating methods, the methods of utilizing coacervation of a hydrophilic colloid sol, as described in U.S. Pat. Nos. 2,800,457 and 2,800,458, interfacial polymerization methods as described in British Pat. Nos. 867,797, 950,443, 989,264, 1,091,076, etc., and so on can be employed.

A color-forming sheet is generally obtained by dissolving electron-donating colorless dyes alone or as a mixture in a proper solvent (e.g., synthetic oils such as alkylated naphthalene, alkylated diphenyl, alkylated diphenylmethane, alkylated terphenyl, etc., vegetable oils such as cotton oil, castor oil, etc., animal oils, mineral oils, and mixtures of two or more of these oils), microencapsulating the resulting solution, and then coating the microcapsules on a support such as paper, a plastic sheet, a resin-coated paper or the like. The dye precursors of the present invention have an additional advantage in that they are highly soluble in the above-described solvents.

As for the dye precursor, the fluoran derivatives of the present invention may be used as single compounds, or as a mixture of two or more compounds, or alternatively, they may be used together with one or more of a compound known as a color-forming agent for heat-sensitive paper, such as Crystal Violet lactone, conventional fluoran derivatives, etc. In the latter case, it is preferred to use the compounds of the present invention in a fraction of about 10 wt% or more, more preferably 40 wt% or more.

Suitable examples of electron-donating colorless dyes which can be employed together with the fluorans of the present invention include triarylmethane compounds, diphenylmethane compounds, xanthene compounds, thiazine compounds, spiropyran compounds, and so on. Specific examples of triarylmethane compounds include 3,3-bis(p-dimethylaminophenyl)-6-dimethylaminophthalide (Crystal Violet lactone), 3,3-bis(p-dimethylaminophenyl)phthalide, 3-(p-dimethylaminophenyl)-3-(1,3-dimethylindole-3-yl)phthalide, 3-(p-dimethylaminophenyl)-3-(2-methlindole-3-yl)phthalide, and so on. Specific examples of diphenylmethane compounds include 4,4'-bis-dimethylaminobenzhydrin benzyl ether, N-halophenyl-Leucoauramine, N-2,4,5-trichlorophenyl-Leucoauramine, and so on. Specific examples of xanthene compounds include Rhodamine-B-anilinolactam, Rhodamine-(p-nitroanilino)lactam, Rhodamine-B-(p-chloroanilino)lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-o-chloroanilino-6-diethylaminofluoran, 2-m-chloroanilino-6-diethylaminofluoran, 2-(3,4-dichloroanilino)-6-diethylaminofluoran, 2-octylamino-6-diethylaminofluoran, 2-dihexylamino-6-diethylaminofluoran, 2-m-trifluoromethylanilino-6-diethylaminofluoran, 2-butylamino-3-chloro-6-diethylaminofluoran, 2-ethoxyethylamino-3-chloro-6-diethylaminofluoran, 2-p-chloroanilino-3-methyl-6-dibutylaminofluoran, 2-anilino-3-methyl-6-dioctylaminofluoran, 2-anilino-3-chloro-6-diethylaminofluoran, 2-diphenylamino-6-diethylaminofluoran, 2-anilino-3-methyl-6-diphenylaminofluoran, 2-phenyl-6-diethylaminofluoran, 2-anilino-3-methyl-6-N-ethyl-N-isoamylaminofluoran, 2-anilino-3-methyl-5-chloro-6-diethylaminofluoran, 2-anilino-3-methyl-6-diethylamino-7-methylfluoran, 2-anilino-3-methoxy-6-dibutylaminofluoran, 2-o-chloroanilino-6-dibutylaminofluoran, 2-p-chloroanilino-3-ethoxy-6-N-ethyl-N-isoamylaminofluoran, 2-o-chloroanilino-6-p-butylanilinofluoran, 2-anilino-3-pentadecyl-6-diethylaminofluoran, 2-anilino-3-ethyl-6-dibutylaminofluoran, 2-anilino-3-ethyl-6-N-ethyl-N-isoamylaminofluoran, 2-anilino-3-ethyl-6-N-ethyl-N-isoamylaminofluoran, 2-anilino-3-methyl-6-N-ethyl-N-γ-methoxypropylaminofluoran, 2-anilino-3-chloro-6-N-ethyl-N-isoamylaminofluoran and so on. Specific examples of thiazine compounds include benzoyl Leucomethylene Blue, p-nitrobenzyl Leucomethylene Blue, and so on. Specific examples of spiropyran compounds include 3-methyl-spiro-dinaphthopyran, 3,3'-dichloro-spiro-dinaphthopyran, 3-benzyl-spiro-dinaphthopyran, 3-methyl-naphtho-(3-methoxybenzo)spiro-pyran, 3-propyl-spiro-dibenzopyran, and so on.

Electron-accepting compounds, preferred examples of which are listed above, are dispersed into a binder, such as styrene-butadiene latex, polyvinyl alcohol or the like, independently, as a mixture of two or more thereof, or together with other electron-accepting compounds. The resulting dispersion is coated on a support, e.g., paper, a plastic sheet, a resin-coated paper or the like, to form a color-developing sheet.

The amounts of electron-donating colorless dyes and electron-accepting compounds to be used are respectively properly chosen depending on the desired thickness of the layer to be coated, the form to be taken by pressure sensitive manifold paper, the encapsulating method to be employed, and other conditions. These amounts can be easily determined by one skilled in the art.

A heat-sensitive paper utilizing the dye precursors of the present invention is prepared in the following manner. Dye precursors which comprise the fluoran derivatives of the present invention, electron-accepting substances and, if necessary, heat fusible substances are thoroughly ground to fine particles, then admixed with a solution or a dispersion prepared by dissolving or dispersing a binder in a proper solvent or dispersion medium. An inorganic pigment, such as kaolin, talc, calcium carbonate, etc., is further added to the resulting admixture to prepare a coating composition. Furthermore, a paraffin wax emulsion, a latex type binder, a sensitivity-increasing agent, a metal soap, an antioxidant, an electric charge-controlling agent, a defoaming agent and an ultraviolet ray-absorbing agent (e.g., hindered phenols, Glauber's salt, sodium chloride, sorbitol, etc.) and so on can be added to the coating composition, if desired.

In addition, an opacity-imparting agent may also be added to the mixture of the above-described ingredients.

The coating composition is coated on a support, such as paper, a plastic sheet, a resin-coated paper, etc., and dried. In preparing the coating composition, all of the ingredients may be mixed and ground together, or they may be divided properly into certain groups in advance, and ground and dispersed in each group independently prior to being mixed all together.

Also, a support may be filled with the coating composition.

Suitable amounts of the ingredients comprising the coating composition for a heat-sensitive recording material are as follows. Dye precursors which comprise the fluoran derivatives in accordance with the present invention are used in an amount of about 1 to about 2 parts by weight, an electron-accepting substance in an amount from about 1 to about 6 parts by weight, a heat fusible substance from 0 to about 30 parts by weight, a pigment from 0 to about 15 parts by weight, a binder from about 1 to about 15 parts by weight, and a dispersion medium in an amount from about 20 to about 300 parts by weight, based on the total weight of the coating composition.

As for the dye precursor, the fluoran derivatives of the present invention may be used as a single compound or as mixture of two or more compounds, or together with compounds known as color-forming agents for pressure sensitive paper, e.g., Crystal Violet lactone, conventional fluoran derivatives, etc.

Water is most suitable dispersion medium.

Examples of binders which can be employed in the present invention include styrene-butadiene copolymers, alkyd resins, acrylamide copolymers, vinyl chloride-vinyl acetate copolymers, styrene-maleic anhydride copolymers, synthetic rubbers, gum arabic, polyvinyl alcohol, hydroxyethyl cellulose and so on.

Of these binders, water-soluble binders, such as gum arabic, polyvinyl alcohol, hydroxymethyl cellulose, carboxymethyl cellulose and the like, are particularly desirable relative to the preferred dispersion medium.

Methods disclosed in Japanese Patent Application (OPI) Nos. 11344/74 and 48930/75 can be referred to for making electrothermo-sensitive paper utilizing the dye precursors of the present invention. Specifically, electrothermo-sensitive paper can be obtained by coating, on a support such as paper, a composition comprising a conductive substance, the dye precursors of the present invention and an electron-accepting substance, which are suspended or dispersed together with a binder in a dispersion medium such as water, or by applying a conductive substance to a support to form a conductive layer and coating a composition prepared by dispersing the dye precursors and electron-accepting substances together with a binder into a dispersion medium such as water onto the conductive layer. When both dye precursors and electron-accepting substances employed are not fused in a desired temperature range (generally from about 70° C. to about 130° C.), a heat fusible substance can be added which melts in such temperature range and dissolves at least either the dye precursor or the electron-accepting substance. In this manner, sensitivity to Joule's heat evolved by charging the material with electricity can be controlled.

As for the electron-accepting substances and the heat fusible substances, the same substances as employed in preparing the above heat-sensitive recording paper can be used.

The recording materials in accordance with the present invention can also be produced by using the fluoran derivatives of the present invention in place of conventional dye precursors such as lactone compounds, lactam compounds, spiropyran compounds, carbinol compounds, ethylene compounds, Leucoauramine compounds, oxazine compounds and so on, which are used in Japanese Patent Publication Nos. 24188/63, 10550/70, 13258/70, 204/74, 6212/74 and 28449/74, Japanese Patent Application (OPI) Nos. 32532/73, 9227/74, 135617/74, 80120/75, 87317/75 and 126228/75, and so on.

Also, recording materials other than the above-described recording materials can be produced by using the fluoran derivatives of the present invention in place of conventional dye precursors.

The fluoran compounds in accordance with the present invention are very useful compounds as dye precursors for various kinds of recording materials, especially for pressure-sensitive paper, heat-sensitive paper, electrothermosensitive paper and the like and furthermore, they are applicable to light-sensitive recording sheets, ultrasonic-sensitive recording sheets, electron-sensitive recording sheet, electrostatic recording sheet, ball pen inks, crayons and so on.

The following examples are not intended to limit the scope of the present invention in any manner.

EXAMPLE 1

One part by weight (unless otherwise indicated hereinafter, all parts are by weight) of the foregoing dye precursor of the present invention (the compound obtained in Synthesis Example 1) was dissolved in 15 parts of alkylated naphthalene. The resulting solution was added with vigorous stirring to 50 parts of water, in which 6 parts of gelatin and 4 parts of gum arabic were dissolved, to achieve emulsification. Oil droplets in the thus-obtained emulsion had a diameter of 4 to 6 microns. 250 Parts of water was added thereto, and then acetic acid was further added little by little until the pH of the resulting emulsion became about 4. Coacervation then took place, resulting in formation of a wall comprising gelatin and gum arabic around the individual oil droplets. This wall was hardened by addition of formaldehyde and accompanied by a subsequent rise in pH to 9.

The thus-obtained microcapsule dispersion was coated on paper and dried. This paper was brought into face-to-face contact with paper on which an acidic organic substance, a phenol resin, 4,4'-isopropylidenediphenol, zinc 3,5-di(α-methylbenzyl)salicylate, p-hydroxybenzoic acid benzyl ester, zinc p-toluenesulfonate, or 2,2'-methylenebis-p-chlorophenol, had been coated alone or in the form of mixture of two or more thereof and pressure was then applied, resulting in instantaneous black coloration. The black color formed had high color density, and was excellent in light resistance and heat resistance.

EXAMPLE 2

A dispersion was prepared by mixing and grinding 30 parts of a dye precursor of the present invention (the compound obtained in Synthesis Example 1), 150 parts of a 10% water solution of polyvinyl alcohol and 70 parts of water over a 8-hour period using a ball mill. At the conclusion of the grinding, particle sizes were about 2 microns. This dispersion was named Ingredient A.

Separately, 30 parts of bisphenol A, 30 parts of stearic acid anilide, 150 parts of a 10% aqueous solution of polyvinyl alcohol, and 55 parts of water were mixed and ground using a sand mill to prepare a dispersion. At the conclusion of the grinding, particle sizes of the insoluble matter were about 2 microns. This dispersion was named Ingredient B.

Then, 5 parts of Ingredient A and 40 parts of Ingredient B were mixed, coated on paper, and dried to form a heat-sensitive paper.

Heat application to this heat-sensitve paper using a heat pen or similar means resulted in black coloration. Further, an original manuscript was superposed on this heat sensitive paper, and heat was applied thereto using a thermosensitive copying machine. Thus, a black copy was obtained. The color image formed was quite stable to light, and evan a one hour irradiation with an ultraviolet lamp hardly caused change in hue and color density.

EXAMPLE 3

(a) Preparation of Color Former Sheet:

An electron-donating colorless dye composed of 0.8 g of 2-anilino-3-methyl-6-diethylamino-5'-methoxyfluoran and 0.6 g of 2-anilino-3-methyl-6-N-ethyl-N-isobutylaminofluoran was dissolved in a mixture of 15 g of alkylated naphthalene and 10 g of paraffins having 10 to 16 carbon atoms. This solution was added with vigorous stirring to 50 g of water in which 6 g of gelatin and 4 g of gum arabic were dissolved, resulting in emulsification. The emulsion thus obtained contained oil droplets having a diameter of 4 to 5 microns. Thereto, 250 g of water was added and further, acetic acid was added little by little to adjust the pH of the emulsion to about 4. Coacervation was thus brought about, and a wall made up of gelatin and gum arabic was formed around the individual oil droplets. This wall was hardened by adding formaldehyde and subsequently increasing the pH up to 9.

The thus-obtained microcapsule dispersion was coated on paper, and dried to produce a color former sheet.

(b) Preparation of Color Developer Sheet:

Zinc 3,5-di($\alpha$-methylbenzyl)salicylate as an electron-accepting compound and polystyrene resin were kneaded in a ratio of 9/1, and a 20 g portion thereof was dispersed into 200 g of a 5% aqueous solution of polyvinyl alcohol. Thereto, 20 g of kaolin (Georgia Kaolin) was further added. The resulting mixture was subjected to thorough dispersion processing to prepare a coating composition. The composition was coated on paper, and dried to obtain a color developer sheet.

The thus-obtained color former sheet and color developer sheet were brought into face-to-face contact with each other and pressure or shock was applied thereto, resulting in instantaneous pure black coloration of high density. The black color developed was excellent in light fastness and heat fastness.

EXAMPLE 4

A mixture of 3 g of $\beta$-naphthol benzyl ether, 5 g of 2-anilino-3-chloro-6-N-dodecyl-N-ethylamino-5'-ethoxyfluoran, 0.8 g of 2-anilino-3-chloro-6-diethylaminofluoran and 50 ml of a 5% aqueous solution of polyvinyl alcohol was subjected to a dispersion step using a horizontal type sand mill. Thus, a dispersion having an average particle diameter of 1.6 microns was obtained.

Separately, a mixture of 10 g of bisphenol A, 10 g of $\beta$-phenoxyethoxyethylbenzene, 20 g of kaolin and 100 ml of a 5% aqueous solution of polyvinyl alcohol was subjected to the same dispersion step as described above to obtain a dispersion having an average particle diameter of 1.5 microns. These dispersions were thoroughly mixed, and added to a dispersion prepared by mixing 5 g of a 50% paraffin wax emulsion with 8 g of stearic acid anisidide. The thus-obtained composition was coated on base paper of 50 g/m$^2$ at a coverage of 5 g/m$^2$ on a solid basis, and dried.

The coated paper was heated with thermal energy of 35 mJ/cm$^2$ by means of a facsimile, resulting in color development. Upon measurement of color density in the colored area with a Macbeth densitometer of the RD-918 type, a value of 1.03 was obtained.

Moreover, the color image obtained was excellent in stability, especially to light. Specifically, substantially no change in hue and density were observed even when the color image was irradiated with an ultraviolet lamp over a 1-hour period.

EXAMPLE 5

Recording paper was produced in the same manner as in Example 4 except that in preparing a dispersion containing fluoran derivatives, a mixture of 2.3 g of 2-anilino-3-methyl-6-diethylamino-5'-ethoxyfluoran with 1 g of 2-anilino-3-chloro-6-diethylaminofluoran and a mixture of 3.2 g of 2-anilino-3-methyl-6-diethylaminofluoran with 1 g of 2-anilino-3-chloro-6-diethylaminofluoran were employed in place of the fluoran derivatives used in Example 4, and the resulting mixtures were subjected independently to a dispersion step using the horizontal type sand mill and then, compounded to obtain a dispersion having an average particle diameter of 14 microns.

A recording paper was prepared in the same manner as in Example 4 by using the thus-obtained dispersion.

Application of thermal energy of 35 mJ/cm$^2$ to the recording paper brought about rapid coloration of high density. The color image developed was excellent in stability.

EXAMPLE 6

A heat sensitive recording material was produced in the same manner as in Example 4 except that 1-(3-aryl-4-hydroxyphenyl)-1-(4-hydroxyphenyl)cycloheptane was employed in place of bisphenol A. In this case also, clear coloration was effected.

While the invention has been described in detail and with reference to specific embodiments thereof, it will be apparent to one skilled in the art that various changes and modifications can be made therein without departing from the spirit and scope thereof.

What is claimed is:

1. A recording material comprising a support having provided thereon a fluoran derivative represented by formula (I):

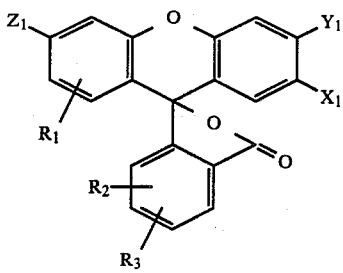

wherein $X_1$ repersents a group derived from an amine, or a hydrogen atom; $Y_1$ represents an alkyl group, an alkoxy group, an aryl group, a halogen atom, a group derived from an amine, an aralkyl group, or a hydrogen atom; $Z_1$ represents a group derived from an amine; $R_1$ represents a halogen atom, a lower alkyl group having 6 or less carbon atoms, or a hydrogen atom; $R_2$ represents an aryloxy group, and $R_3$ represents a hydrogen atom, a halogen atom, or an alkyl group.

2. A recording material as in claim 1, wherein said fluoran derivative is represented by formula (II):

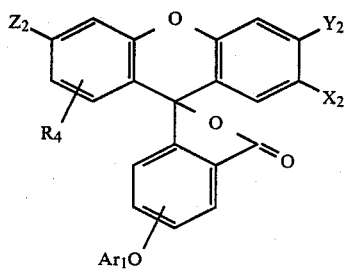

wherein $X_2$ represents a hydrogen atom or a group derived from an amine; $Y_2$ represents a hydrogen atom, an alkyl group, an alkoxy group, an aryl group, a halogen atom, or a group derived from an an amine; $Z_2$ represents a group derived from an amine; $Ar_1$ represents an aryl group; and $R_4$ represents a hydrogen atom, a halogen atom, or a lower alkyl group having 6 or less carbon atoms.

3. A recording material as in claim 2, wherein $X_2$ represents

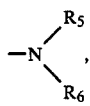

wherein $R_5$ and $R_6$ each represents a hydrogen atom, an alkyl group containing not more than 18 carbon atoms, or an aryl group containing from 6 to 12 carbon atoms.

4. A recording material as in claim 3, where $R_5$ and $R_6$ each represents a hydrogen atom, an alkyl group containing not more than 10 carbon atoms or an aryl group containing from 6 to 10 carbon atoms.

5. A recording material as in claim 2, wherein $Y_2$ represents a hydrogen atom, an alkyl group having from 1 to 18 carbon atoms, an alkoxy group having from 1 to 5 carbon atoms, an aryl group having from 6 to 12 carbon atoms, or a halogen atom.

6. A recording material as in claim 5, wherein $Y_2$ represents a methyl group, an ethyl group, a propyl group, a butyl group, a pentadecyl group, a methoxy group, an ethoxy group, a phenyl group, a tolyl group, a xylyl group, halogen-substituted phenyl groups, a fluorine atom, a chlorine atom, or a group derived from a primary or secondary amine having from 1–8 carbon atoms.

7. A recording material as in claim 2, wherein $Z_2$ represents a group derived from a primary or secondary amine having from 1 to 8 carbon atoms.

8. A recording material as in claim 2, wherein $Ar_1$ represents an aryl group having from 6 to 12 carbon atoms.

9. A recording material as in claim 2, wherein $R_4$ represents a hydrogen atom, a chlorine atom, a methyl group, or an ethyl group.

10. A recording material as in claim 1, wherein said fluoran derivative is represented by formula (IV):

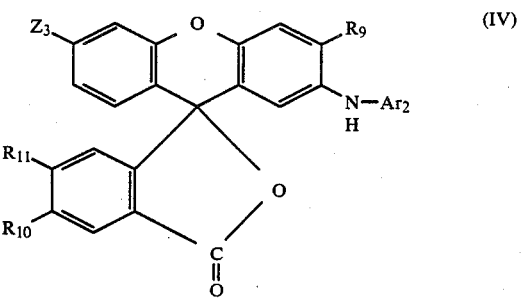

wherein $Z_3$ represents a group derived from an amine; $R_9$ represents an aryl group, an aralkyl group, an alkyl group, a halogen atom, an alkoxy group, or a hydrogen atom; $Ar_2$ represents an aryl group; and either $R_{10}$ or $R_{11}$ represents an aryloxy group, and either $R_{10}$ or $R_{11}$ which does not represent an aryloxy group represents a hydrogen atom, a halogen atom, or an alkyl group.

11. A recording material as in claim 10, wherein $Z_3$ represents

wherein $R_7$ represents an alkyl group having from 1 to 18 carbon atoms and $R_8$ represents a lower alkyl group having 6 or less carbon atoms.

12. A recording material as in claim 11, wherein $R_7$ represents an alkyl group having an even numbered amount of carbon atoms, having a chain structure, and having a methylene group at the α-position.

13. A recording material as in claim 11, wherein $R_8$ represents a lower alkyl group having 6 or less carbon atoms substituted by a methylene group at the α-position.

14. A recording material as in claim 10, wherein $R_9$ represents a halogen atom or an alkyl group.

15. A recording material as in claim 10, wherein $Ar_2$ represents a substituted or unsubstituted aromatic ring.

16. A recording material as in claim 10, wherein said fluoran derivative is represented by formula (III), wherein $R_{10}$ represents an alkoxy group, $Ar_2$ represents a β-ethoxyethyl group, and $R_9$ represents a halogen atom; or said fluoran derivative is represented by formula (III) wherein $R_{10}$ represents an alkoxy group, $Ar_2$ represents a phenyl group, a chlorophenyl group, or a tolyl group, and $R_9$ represents a halogen atom or an alkyl group.

17. A recording material as in claim 1, further having provided on the support an electron accepting compound.

18. A pressure sensitive recording paper comprised of a first and a second sheet of recording material, said first sheet comprising a recording material containing a fluoran derivative as in claim 1 and said second sheet containing an electron accepting compound.

19. A recording material as in claim 1, wherein said recording material is produced by coating on a support a composition comprising one or more of said fluoran derivatives, a heat fusable substance, a binder, a pigment, and a dispersing medium.

20. A recording material as in claim 19, wherein fluoran derivatives are present in an amount of about 1 to about 2 parts by weight, said electron-accepting substance is present in an amount of from about 1 to about 6 parts by weight, said heat fusable substance is present in an amount of from 0 to about 30 parts by weight, said pigment is present in an amount of from 0 to about 15 parts by weight, said binder is present in an amount of from about 1 to about 15 parts by weight, and said dispersing medium is present in an amount of from about 20 to 300 parts by weight, based on the total weight of the composition.

* * * * *